(12) United States Patent
Cohen

(10) Patent No.: US 7,551,069 B2
(45) Date of Patent: Jun. 23, 2009

(54) TYRE DATA MONITORING SYSTEMS

(75) Inventor: Phillip Albert Cohen, Killara (AU)

(73) Assignee: Nicholas Mangafas, Sydney, New South Whales (AU)

( * ) Notice: Subject to any disclaimer, the term of this patent is extended or adjusted under 35 U.S.C. 154(b) by 432 days.

(21) Appl. No.: 10/534,899

(22) PCT Filed: Nov. 18, 2003

(86) PCT No.: PCT/AU03/01638

§ 371 (c)(1),
(2), (4) Date: Mar. 1, 2006

(87) PCT Pub. No.: WO2004/045875

PCT Pub. Date: Jun. 3, 2004

(65) Prior Publication Data

US 2006/0156802 A1    Jul. 20, 2006

(30) Foreign Application Priority Data

Nov. 18, 2002 (AU) ............................. 2002952723

(51) Int. Cl.
*B60C 23/00* (2006.01)
*B60C 23/02* (2006.01)
*B60C 1/00* (2006.01)
*B60C 19/00* (2006.01)
*B60C 19/08* (2006.01)

(52) U.S. Cl. .................. 340/442; 340/443; 340/444; 340/445; 340/446; 340/447; 340/448; 340/449; 73/146.2; 73/146.3; 73/146.4; 73/146.5; 73/146.8; 152/152.1

(58) Field of Classification Search ......... 340/442–448; 73/146.2–146.5; 152/152.1
See application file for complete search history.

(56) References Cited

U.S. PATENT DOCUMENTS

| | | | |
|---|---|---|---|
| 2,966,650 A | | 12/1960 | Earnest |
| 3,370,459 A | | 2/1968 | Cescati |
| 3,675,198 A | | 7/1972 | Drown |
| 3,852,717 A | * | 12/1974 | Hosaka et al. ............... 340/448 |
| 3,881,170 A | * | 4/1975 | Hosaka et al. ............... 340/448 |
| 4,103,283 A | * | 7/1978 | Lee ............................ 340/448 |
| 5,193,387 A | * | 3/1993 | Hodate ....................... 73/146.5 |
| 5,228,337 A | * | 7/1993 | Sharpe et al. .............. 73/146.5 |
| 5,583,482 A | * | 12/1996 | Chamussy et al. .......... 340/442 |
| 5,673,018 A | | 9/1997 | Lowe et al. |
| 5,939,977 A | | 8/1999 | Monson |
| 5,969,239 A | * | 10/1999 | Tromeur et al. ............. 73/146.5 |
| 6,304,610 B1 | | 10/2001 | Monson |
| 7,021,132 B2 | * | 4/2006 | Nigon et al. ............... 73/146.5 |
| 7,205,885 B2 | * | 4/2007 | Kulha ......................... 340/442 |

FOREIGN PATENT DOCUMENTS

GB    2 207 760 A    2/1989

* cited by examiner

*Primary Examiner*—Benjamin C Lee
*Assistant Examiner*—Lam P Pham
(74) *Attorney, Agent, or Firm*—Pearne & Gordon LLP

(57) ABSTRACT

A vehicle tyre data monitoring system has a wheel mounted sensor means that is adapted to transmit one or more of pressure, temperature, angular velocity, and force vector data for a tyre as a digital serial datagram through a two-wire communication channel to a chassis mounted reader means. The communication channel is adapted to simultaneously supply power to the sensor means and receive the data for processing and subsequent display to a user of the system.

11 Claims, 18 Drawing Sheets

2 Terminal Sensor Packaging

Fig. 5 Tyre Valve Insulated Electrode Used To Connect Sensor To External Face Of Wheel Rim

System Implementation showing TPMS Enabled Wheel Rim and TPMS Enabled Disk Brake Caliper

EQUIVALENT T CIRCUIT

FOR SINUSOIDS, VOLTAGE $V_{12}$ COUPLED INTO THE INPUT BY A CURRENT $I_2$ IS $V_{12} = j\omega M_{12} I_2$ WHERE $Z_{12} = j\omega M_{12}$ = MUTUAL IMPEDANCE IF $Z_{12} = Z_{21}$ OR $M_{12} = M_{21} = M$ USING RECIPROCITY FOR A BILATERAL NETWORK, THEN $V_1 = j\omega L_1 I_1 + j\omega M I_2 = Z_{11} I_1 + Z_{12} I_2$
AND $V_2 = j\omega M I_1 + j\omega L_2 I_2 = Z_{21} I_1 + Z_{22} I_2$ Non Contact System Showing
TPMS Enabled Steel Wheel Rim and
TPMS Enabled Disk Brake Caliper
Mounting Bracket Non Contact System Showing TPMS Enabled Steel Wheel Rim and TPMS Enabled Disk Brake Caliper Mounting Bracket

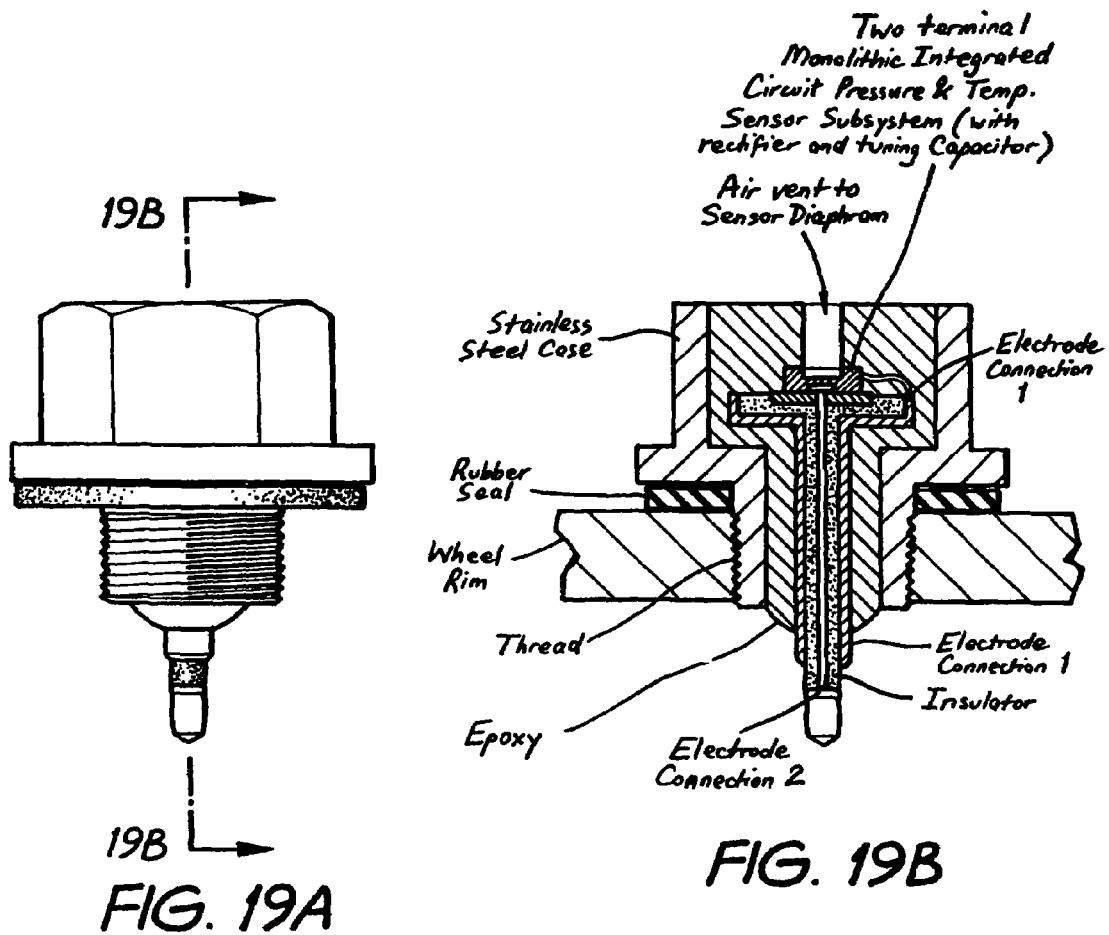
FIG. 19A
FIG. 19B
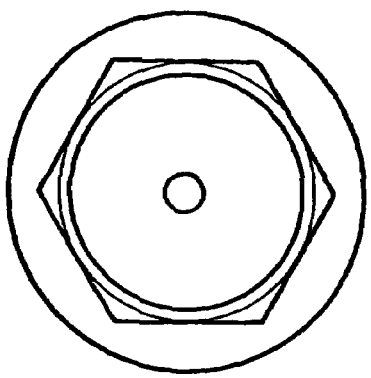
FIG. 19C
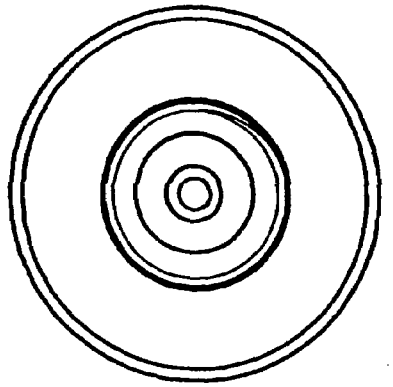
FIG. 19D

TYRE DATA MONITORING SYSTEMS

FIELD OF THE INVENTION

The present invention relates to vehicle tyre data monitoring systems and, more particularly, to a two-wire communication channel between a vehicle's wheel mounted sensor means and chassis mounted reader or receiving means.

BACKGROUND OF THE INVENTION

There are two types of tyre pressure monitoring systems (TPMS) currently available which alert a vehicle's driver to abnormal tyre pressure conditions: direct measurement systems and indirect measurement systems. A direct measurement system measures tyre pressure directly with physical pressure sensors. Indirect measurement systems measure something other than actual tyre pressure, such as relative wheel angular velocities or axle to road height changes.

The class of direct measurement systems can be further categorized according to the means employed to provide power to the sensor and implement the communication channel between a vehicle's wheel mounted sensor means and chassis mounted receiving means. Notwithstanding power supply difficulties, just getting the signals off electrical sensors that are mounted inside the rotating wheels presents a serious problem. The prior art approach typically involved wheel mounted, battery powered radio frequency (RF) transmitter modules which continue to suffer from system limitations and reliability problems.

Limitations of battery powered RF transmitter modules include:

- a dependence on battery power sources inside the tyre (Once batteries are depleted, operation is compromised and replacement is costly);
- in order to conserve battery power, continuous monitoring is not possible, (Transmission of sensed information takes place only when a pressure activation floor is passed (non-deterministic transmission algorithm));
- difficulties identifying tyre positions after tyres undergo rotation schedules (Usually, tyre positions must be manually reprogrammed);
- cross-talk between other adjacent vehicles with active transmitters and receivers;
- the receiver's electronics being subject to deafening by spurious energy fields from external sources (e.g., television transmitters, garage door openers and CB radios etc.,); and
- being affected adversely by the influence of metallic vehicle parts on energy field density patterns in the vicinity of the receiver antennae.

The performance of the aforementioned prior art approach varies greatly between vehicle models because every vehicle model has a different geometry that may interfere adversely with energy field densities.

In contrast, the present invention is based on the direct measurement TPMS approach which employs a two-wire communication channel between wheel mounted sensors and chassis mounted receiver electronics. Importantly, this approach obviates the need for sensor batteries inside the tyre, can use the minimum number of physical conductors (two), is economical and has a highly predictable and reliable performance.

The object of the present invention is to provide an economical and highly reliable system to alert the driver of a vehicle to any abnormal pressures, temperatures, angular velocities or force vectors which may exist in any or all of the vehicle's tyres (including the spare tyre) under all driving or stationary conditions. The system is deterministic and is not affected by tyre replacement, tyre rotations, or deafening of the receiver electronics by radio frequency interference.

SUMMARY OF THE INVENTION

The present invention is directed to a system that provides power to a wheel mounted sensor means so that they perform measurement of tyre pressure, temperature, angular velocity or force vector data. The system provides the means for the subsequent transmission of this data to chassis mounted reader means comprising receiving means mounted on a non-rotating component of a hub for the wheel and display subsystems. Normal and abnormal operating pressure and temperature information, for example, of a vehicle's pneumatic tyres are then available to a vehicle's driver.

According to the invention, there is provided a vehicle tyre data monitoring system comprising a wheel mounted sensor means adapted to transmit one or more of pressure, temperature, angular velocity, and force vector data for a tyre as a digital serial datagram through a two-wire communication channel to a chassis mounted reader means, the communication channel being adapted to simultaneously supply power to the sensor means and receive the data for processing and subsequent display to a user of the system.

Preferably, the sensor means comprises a three or more terminal sensor subsystem having at least separate ground, power and data connections which is converted to a two terminal sensor subsystem for transmitting the data across the communication channel to the reader means, with a first terminal being for a ground connection and a second terminal being for a combined power and data connection.

It is preferred that the two-wire communication channel superimposes the transmission of the data on the power connection as a serial datagram that is received by the receiving means.

Also preferably, the datagram is decoded by the reader means to provide decoded information that is made available to a microprocessor system for analysis and display of the tyre data to a user of the system.

In a first form of the invention, there is provided a two-wire communication channel for a vehicle tyre data monitoring system, the channel including continuous contacting means for communicating between a sensor means mounted on a wheel of the vehicle and a reader means mounted on a chassis of the vehicle, and being adapted to transmit one or more of pressure, temperature, angular velocity and force vector data for a tyre as a digital serial datagram from the sensor means to the reader means and to supply power from the reader means to the sensor means, the supply of power being simultaneous with the transmission and reception of the data, wherein the communication channel includes a rotational coupling means having a first part mounted on a rotatable rim for the wheel and a second part mounted on a non-rotating component of a hub for the wheel, the first and second parts providing a contacting, two wire communication channel for the data monitoring system.

In accordance with the above first form of the invention, there is provided a continuous coupling in a two-wire communication channel for a vehicle tyre data monitoring system, the continuous coupling comprising a first part mounted on a rotatable rim of a wheel of the vehicle, and a second part mounted on a non-rotating component of a hub for the wheel, the first part and the second part being adapted to maintain continuous electrical contact therebetween during rotation of the wheel for the transmission of decodable data for the tyre from a sensor means mounted on the wheel to a reader means mounted on the chassis.

Further in accordance with the above first form of the invention, there is provided a vehicle wheel to hub electrical mating interconnection in a tyre data monitoring system for the transmission thereacross of one or more of pressure, temperature, angular velocity and force vector data for a tyre mounted on the wheel, the electrical mating interconnection comprising a first part mounted on a rotatable rim of the wheel and adapted to receive the data from a sensor means, and a second part mounted on a non-rotating component of a hub for the wheel, the second part being adapted to mate with the first part when the wheel is mounted on the hub so as to allow the data to be transmitted from the first part to the second part, the second part being further adapted to transmit the data to a reader means mounted on a chassis of the vehicle for processing and subsequent display to a user of the system.

Preferably, the mating of the first part with the second part occurs automatically during the mounting of the wheel on the hub, and demating occurs automatically during dismounting of the wheel from the hub.

In a second form of the invention, there is provided a two-wire communication channel for a vehicle tyre data monitoring system, the channel including electromagnetic transforming means for communicating between a sensor means mounted on a wheel of the vehicle and a reader means mounted on a chassis of the vehicle, and being adapted to transmit one or more of pressure, temperature, angular velocity and force vector data for a tyre as a digital serial datagram from the sensor means to the reader means and to supply power from the reader means to the sensor means, the supply of power being simultaneous with the transmission and reception of the data, wherein a first part of the electromagnetic transforming means is mounted annularly on a rim of the wheel and a second part of the electromagnetic transforming means is mounted on a non-rotating component of a hub for the wheel, the first and second parts being divided by an air gap and providing a non-contacting, two wire communication channel for the data monitoring system.

In accordance with the above second form of the invention, there is provided an electromagnetic coupling in a two-wire communication channel for a vehicle tyre data monitoring system, the electromagnetic coupling comprising a first part mounted annularly on a rim of a wheel of the vehicle, and a second part mounted on a non-rotating component of a hub for the wheel, the first part and the second part being adapted to maintain electromagnetic induction therebetween during rotation of the wheel for the transmission of decodable data for the tyre from a sensor means mounted on the wheel to a reader means mounted on the chassis.

Preferably, the second part comprises a receiver coil mounted on a non-rotating component of a hub for the wheel, such as on a mounting bracket for a brake caliper, and the first part comprises a sensor coil so mounted annularly on the rim of the wheel as to maintain a constant and sufficiently proximate distance to the receiver coil during rotation of the wheel for electromagnetic induction to occur.

Preferably, the sensor coil includes a power supply circuit and derives power to operate the sensing and transmission of the data from an electromagnetic flux generated by the receiver coil serving as a power connection, the electromagnetic flux causing the power supply circuit of the sensor coil to develop sufficient DC voltage to enable the sensor means to be energised and to transmit the data to the reader means, the data being adapted to modulate the electromagnetic flux so as to superimpose the transmission of the data on the power connection as a serial datagram, the so modulated signal being detected and decoded by the reader means to enable the data to be processed and displayed to a user of the system.

Receiver interface electronics in the chassis mounted reader means extracts the power connection's superimposed serial data. The reader means may include an electromagnetic reader module, and a microprocessor system in the module analyses the recovered data for abnormal conditions. The reader module preferably has further interface options that are suitable for connection to various known motor vehicle body electronics systems. These interface options include the Bosch Controller Area Network (CAN) bus, GM's LAN bus, RS232 serial port and "Tell Tale" warning light with audible alarm.

SUMMARY OF THE DRAWINGS

FIG. 19 is a diagram of a two-terminal sensor subsystem stud mounting encapsulation package used in a preferred embodiment of the second form of the invention.

DETAILED DESCRIPTION OF PREFERRED EMBODIMENTS OF THE INVENTION

1. Sensor Subsystem Interface for Continuous Contact System.

Industry standard three terminal (Ground, Power and Data) pressure sensor subsystems are available which have a digital asynchronous serial data transmission output. They have a recommended power supply of between 2.5 and 3.6 Volts, a current consumption of typically 12 micro Amps, and operate over a temperature range of −40 to +125 degrees Centigrade.

Figure 1:
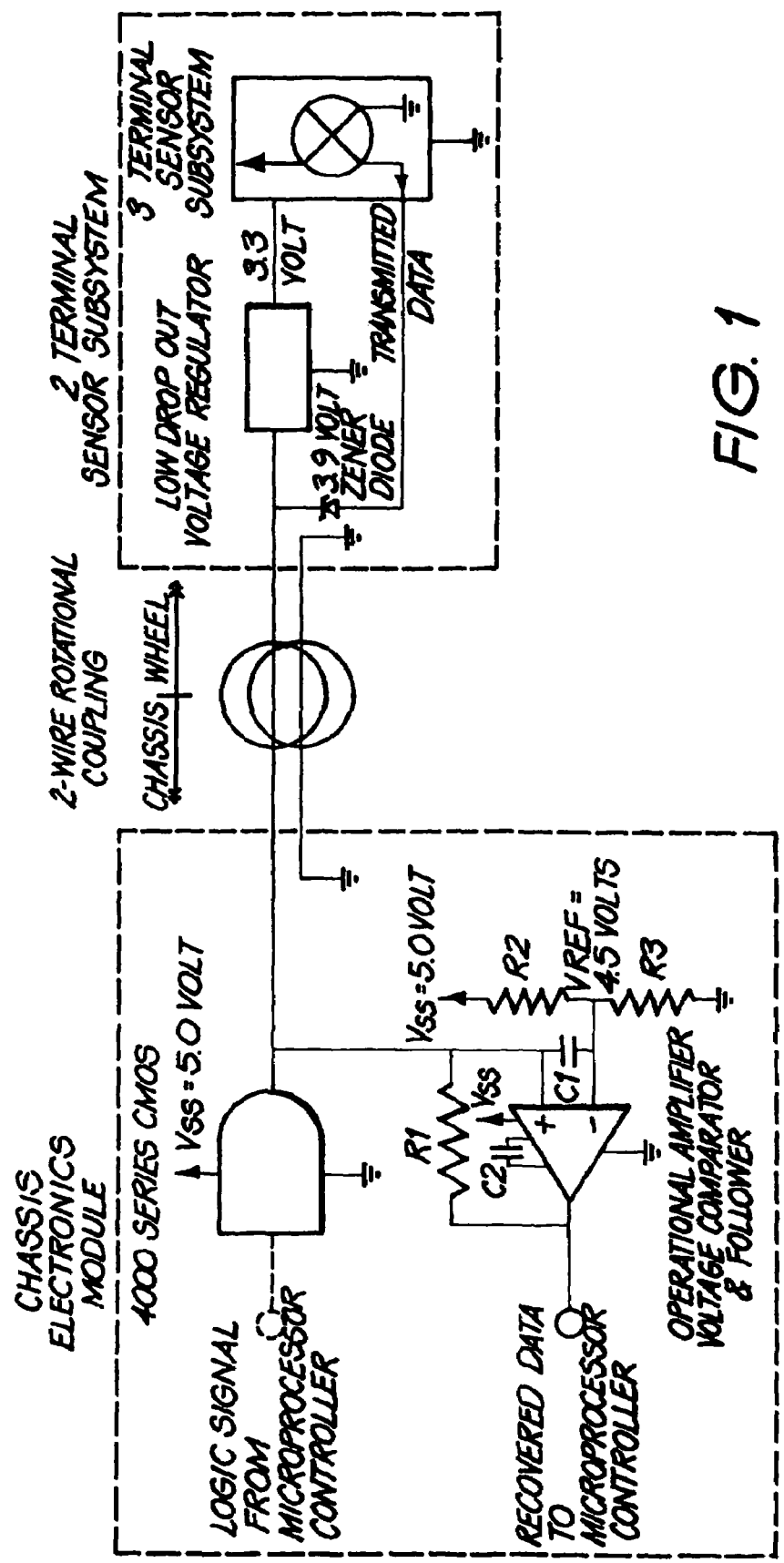
FIG. 1 is a diagram of a preferred two-wire communication channel for a vehicle tyre data monitoring system according to a first form of the present invention.
Figure 2:
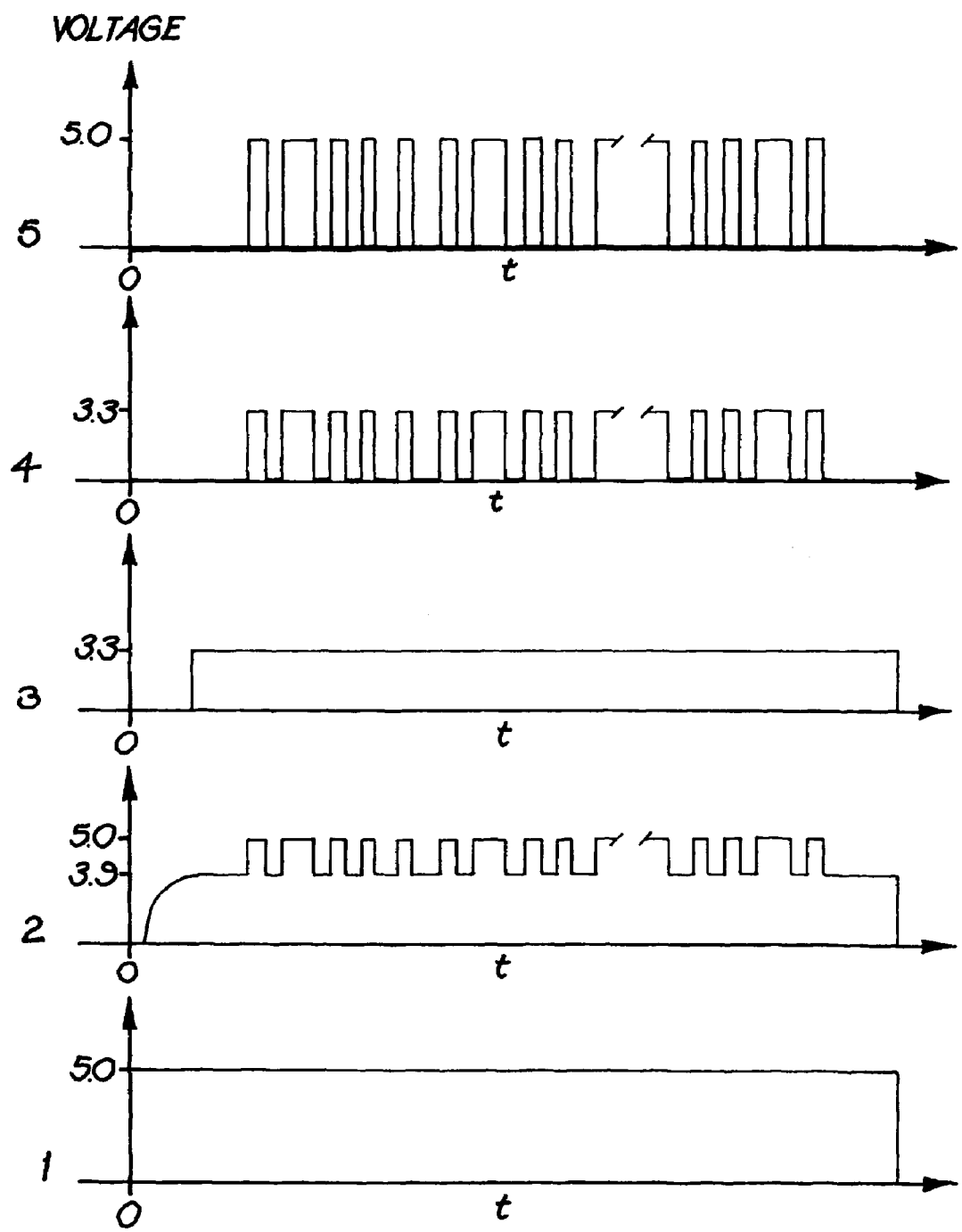
FIG. 2 is a diagram showing signal waveforms referenced to FIG. 1.

FIG. 1 shows a typical three-terminal sensor subsystem having connections of Ground, Power (3.3 Volts) and Asynchronous Serial Data Output. FIG. 1 shows Power being supplied to the sensor subsystem via a low noise, low voltage drop out, zero capacitor type voltage regulator (Vin=3.9-5.0 Volts, Vout=3.3 Volts) with specifications as follows:

Process: CMOS
Maximum Input Voltage: 5.5 V
Output Voltage: 3.3 V
Drop out voltage @ 50 mA: 55 mV
Operating Current @ no-load: 85 μA
Operating Current @ 50 mA: 150 μA
Input Capacitor: None
Output Capacitor: None
Output noise @ 100 KHz: 30 μVrms
Accuracy: 2.0%
Line Regulation: 0.1% /V max
Load Regulation: 0.02% max The voltage input to the voltage regulator is supplied from an industry standard 4000 B series Complementary Metal Oxide Semiconductor (CMOS) logic gate's output stage. The input to the CMOS logic stage (FIG. 2, Waveform 1) is part of a microprocessor controlled system and functions as a signal which initiates or requests the beginning of a data measurement and transmission cycle. With reference to FIG. 2, a serial datagram transmission from the sensor subsystem (Waveform 4) commences after a nominal delay following application of power (Waveforms 2 and 3) from the CMOS logic gate. The sensor subsystem's output datagram is transmitted in asynchronous serial format with a voltage swing of between 0 and 3.3 Volts. This voltage swing is applied to the CMOS logic gate's output via a 3.9 Volt Zener diode having the following specifications:

Zener Voltage: 3.90 V
Maximum Zener Current: 5.00 mA
Maximum Power Dissipation: 500 mW
Tolerance: 5.00%
Temperature Coefficient: −2.50 mV per ° C.
Load Regulation: 0.02% max
DV/dl/Ohm 90.00

When the transmitted datagram signal is at 0 Volts, the Zener diode will conduct and operate in its avalanche region where large changes in current produce only small changes in diode voltage. The amount of current which the CMOS output is capable of sourcing or sinking is limited by the channel impedance of its complementary pair output structure. This current will be the sum of the Zener current, the voltage regulator operational current (a maximum of 150 micro Amps) and the sensor subsystem's current (a maximum of 12 micro Amps). Under these load current conditions the Zener diode will regulate its load voltage to 3.9 Volts, with the Zener diode's power dissipation well within its rating of 500 milli Watts. It should also be noted that in general, the outputs of standard CMOS devices are robust and may be shorted to the supply rails at low operating voltages. MOS transistors have a negative temperature coefficient, which results in inherent burn-out/short circuit protection.

When the transmitted datagram signal is at 3.3 Volts, the Zener diode current will be negligible and the CMOS output will remain at 5.0 Volts. The superimposed data waveform is shown in FIG. 2 Waveform 2. Actual data swing of between 3.9 and 5.0 Volts is superimposed on the CMOS logic gate's output stage. Throughout the datagram transmission, the regulated voltage of 3.3 Volts is maintained to the sensor subsystem by the low voltage drop out (~55 millivolts) regulator (waveform 3).

2. Receiver Electronics Interface for Continuous Contact System.

FIG. 1 shows a single power rail (+5 Volt) operational amplifier configured as a voltage comparator and follower with positive feedback. (R1=10K) The positive feedback provided by R1 ensures clean rapid changes of state. The input signal is the power line's superimposed data signal previously described in waveform 2. The reference discrimination voltage level is selected to be 4.5 Volts, approximately midway between the superimposed data values of 3.9 and 5.0 Volts. At a 4.5 volt reference threshold, hysteresis of the operational amplifier and the RC characteristics of the transmission line have negligible effect on the mark space ratio of the recovered signal at the low frequency (typically 56 Kbps) of the data being transmitted. The capacitor C1=0.01 micro Farad is connected directly across the input pins to produce a clean comparator output. The capacitor C2=0.01 micro Farad minimizes susceptibility to AC coupling. The operational amplifier's output signal is the recovered data shown in FIG. 2, waveform 5. This output is now available as a 0 to 5 Volt digital signal to a microprocessor subsystem for further processing and subsequent control of the other system interfaces (CAN bus, etc) of the receiver electronics module.

Figure 3:
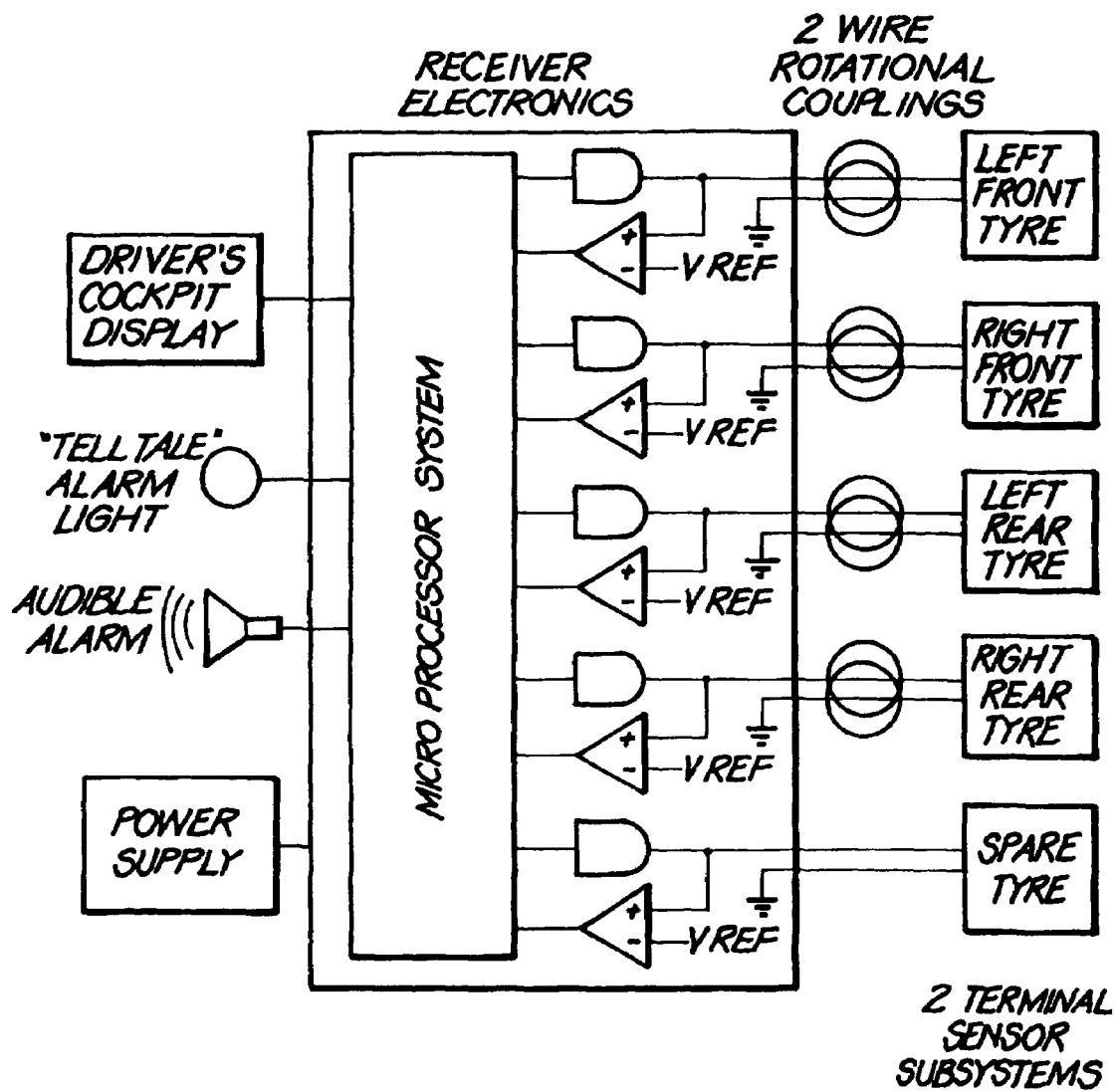
FIG. 3 is a diagram showing a complete five channel system for monitoring five tyres according to a preferred embodiment of the first form of the invention.

FIG. 3 shows a complete five channel system with receiver electronics monitoring four rotating tyres and a spare tyre.

3. Two-Wire Communication Channels for Continuous Contact System.

The two-wire communication channel described herein converts each three terminal (Ground, Power and Data) sensor subsystem to a two-terminal device requiring one connection to the receiver electronics ground reference and the other connection to facilitate a simultaneous power with superimposed data signal to the chassis mounted electronics interface. Standard semiconductor foundry processes may be applied to replace the discrete electronics of the two-terminal sensor subsystem with a single monolithic integrated circuit encapsulated within an industry standard package, such as TO-220 standard or a stud design as shown in FIG. 4.

Figure 5:
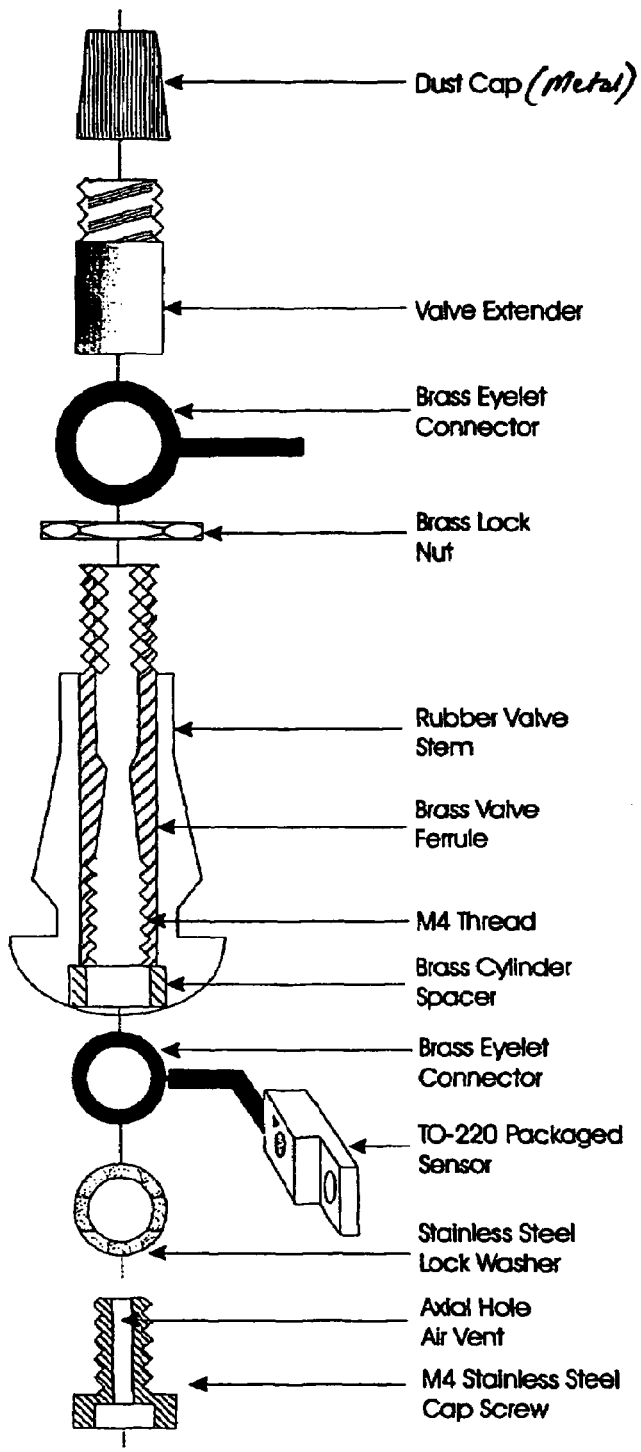
FIG. 5 is a diagram of a tyre valve receptacle insulated electrode used to connect a sensor to the external face of the tyre rim in a preferred embodiment of the first form of the invention.

When a TO-220 case is used to encapsulate the two-terminal sensor, its ground terminal is electrically connected to a suitable nut which is welded to the wheel rim's inside surface at a position of minimum diameter and adjacent to the valve stem receptacle. The power/data connection eyelet of the two-terminal sensor subsystem is electrically connected to the bottom of the internal brass ferrule of a rubber valve receptacle using an M4 threaded stainless steel cap screw, locking washer and cylindrical brass spacer, as shown in FIG. 5. The M4 cap screw has a 2 mm diameter axial hole to allow for the passage of air during inflation and deflation procedures. According to this arrangement, the valve receptacle now has dual functions of valve and insulated electrical terminal. The valve's ferrule electrically connects the wheel's internal two-terminal sensor subsystem's power/data signal to the wheel's outward facing external environment. An electrical connection between the valve receptacle's external brass ferrule and a wheel to hub electrical mating system is facilitated. The electrical connection may be made using a single insulated wire or a flexible mylar insulated single track printed circuit applied directly to the wheel rim. Electrical ground connection between wheel rim and hub is achieved via the wheel rim's contact with the metal of the ring assembly.

Figure 4:
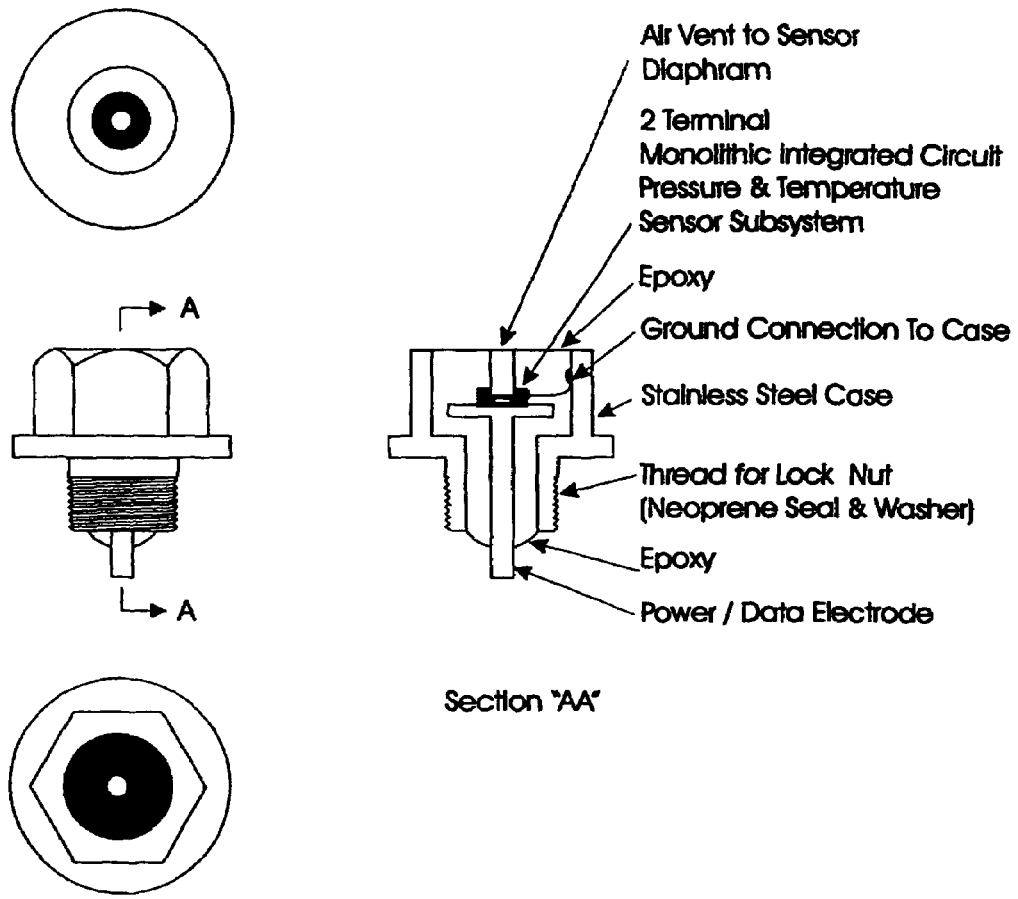
FIG. 4 is a diagram of a two-terminal sensor subsystem stud mounting encapsulation package used in a preferred embodiment of the first form of the invention.

Alternately, when the stud design of FIG. 4 is used to encapsulate the two-terminal sensor, it is mounted on the inside of the wheel rim via a hole located at a position of minimum wheel rim diameter. According to this arrangement, the wheel's internal two-terminal sensor subsystem's power/data signal is made available to the wheel's inward facing external environment. An electrical connection between the stud's insulated Power/Data pin and a wheel to hub electrical mating system is facilitated. The electrical connection may be made using a single insulated wire or a flexible mylar insulated single conductor track printed circuit applied directly to the wheel rim. Electrical ground connection between wheel rim and hub is achieved via the wheel rim's contact with the metal of the ring assembly.

The wheel to hub electrical mating system allows the wheels to be removed and replaced in the standard manner whilst simultaneously providing an automatic electrical connection for the sensor subsystem's ground and power/data connections.

The two-wire communication channels further include rotational or continuous couplings (which are symbolically depicted in FIG. 1) and which are mounted on non-rotating components of a wheel hub, such as on a brake caliper mounting bracket. The function of the rotational couplings is to make two continuous electrical connections from points on a stationary chassis to points on rotating wheels. Electrical connections are for both ground reference and power, with the sensor subsystem's transmitted data signal being superimposed on the power line connection. Coupling rotation speeds vary from zero (stationary) through a slow creep to high revolutions per minute (e.g., 2000 RPM).

The successful use of electrode type rotational couplings to implement the two-wire communication channels described herein is preferably dependent on achieving:

(1) low ohmic contact resistance (less than 1 milli ohm);
(2) low electrical noise insertion;
(3) electrical isolation between circuits;
(4) low maintenance and high reliability at continuous operating speeds of up to 2000 rpm;
(5) compactness and the arrangement of their physical installation and connector wiring pathway; and
(6) low cost.

Preferred rotational couplings of the electrode type for use in this invention have the following specifications:

Conductors: 2
Voltage Range: 0-12 V DC
Current Rating: 10 mA
Power Rating: 120 mW
Maximum Frequency: 200 MHz
Contact Resistance: <1 mΩ
Maximum RPM: 2000
Operating Temperature: −25 to 125° C.
Rotational Torque: 75 gm-cm
Circuit separation >25 MΩ

The rotational coupling's contact arrangements for noise sensitive data signals consist of low ohmic contact electrodes riding on slip rings coated with similar materials. Suitable contact materials include silver impregnated carbon, riding on stainless steel slip rings. Multiple contacts per connection can be used to keep electrical noise extremely low using the contact materials indicated. The rotational couplings used are selected to be cost effective and to provide a long, highly reliable service life in the wheel area environment where water, dirt and both high and low temperatures are prevalent.

The use of a Cyclic Redundancy Checking (CRC) algorithm applied to the sensor subsystem's serial datagram further enhances the ability of the overall system to cope with any noise introduced into the communication channel.

3.1 Practical Considerations of "Single Wire Coupling with Chassis Ground" Versus "Two-Wire Coupling"

In order to achieve the most elegant yet reliable implementation for the communication channel, a two-wire coupling system is preferred over a single wire coupling which relies upon the continuity of chassis ground for the second connection. The reasons are as follows:

Motor vehicles have two types of axles: stub axles and live, or driven, axles. In each type of axle, greased bearings are employed. The bearings have an inner and an outer surface. In one arrangement, the outer bearing surface is fixed to the vehicle's chassis/suspension whilst the bearing's inner surface is fixed to the axle. An opposite arrangement has the outer bearing surface fixed to the axle whilst the bearing's inner surface is fixed to the vehicle's chassis/suspension.

When a wheel axle's ball bearings are rotating, the bearing's metallic components become separated by elastohydrodynamic films of lubricating grease. Whilst this is desired for lubrication, unfortunately typical bearing grease presents high electrical resistance which results in the wheel rim's ground connection being insulated from the chassis ground reference. Additionally, the electrical resistance of each wheel's suspension and axle components (shock absorber mounts and transmission train ball bearing races) needs to be overcome in order to provide low resistance in the ground path. In most vehicles, the wheel's suspension mechanism employs rubber components, which also tend to insulate the wheel from the chassis.

Whilst the previously mentioned high resistance points may be corrected by the use of ground straps and suitable electrically conductive bearing grease, the preferred embodiment of this invention uses two-wire rotational or continuous couplings mounted directly on the wheel rim. Whilst stub axles have "end-of-shaft" mounting options for rotational couplings, driven axles typically require "through-shaft" mounting of rotational couplings. Instead, this invention preferably uses slip rings mounted directly on the wheel rim, and so obviates the need for couplings with unique wiring pathways for each type of axle in order that the vehicle ground reference and signal connection to the sensor subsystems and receiver electronics module, used in the two-wire communication channel, can be strictly maintained.

Figure 6:
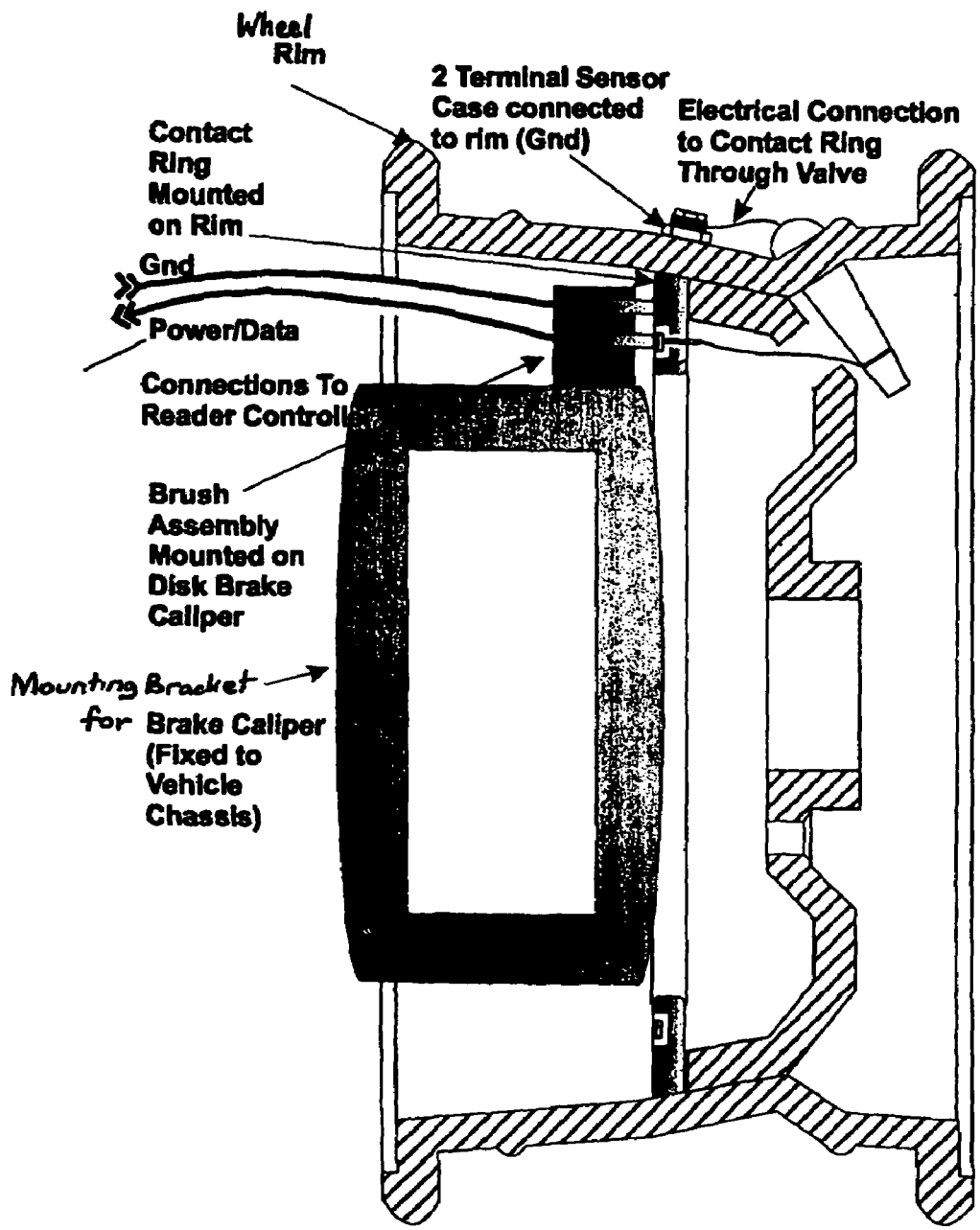
FIG. 6 is a diagram of a wheel rim showing a sensor mounting and a continuous rotational coupling to a receiving means in another preferred embodiment of the first form of the invention.

Referring to FIG. 6, a direct electrical contact, continuous rotational coupling system is employed in the arrangement shown that does not require the two-wire communication channel to pass through axial holes in the axles.

4. Electromagnetically Coupled System.

A preferred tyre pressure monitoring system of the invention will now be described which is based on passive (no local battery) two terminal sensor elements and non-contact transmission of power and data across a vehicle's rotating wheel chassis boundary.

Figure 7:
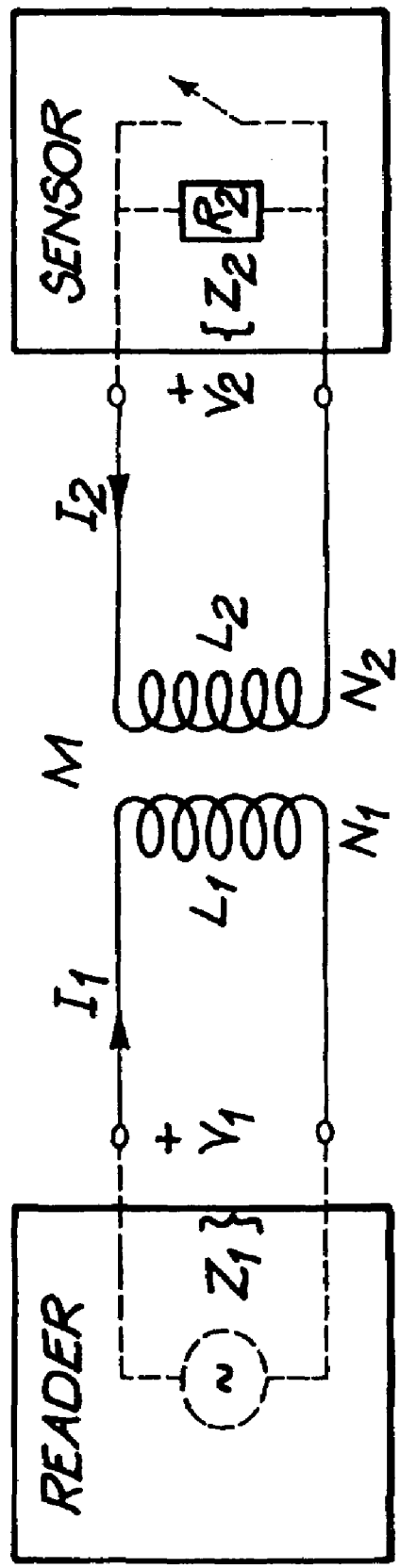
FIG. 7 is a circuit diagram of an inductively coupled circuit that illustrates an underlying relationship of factors involved in inductance.
Figure 8:
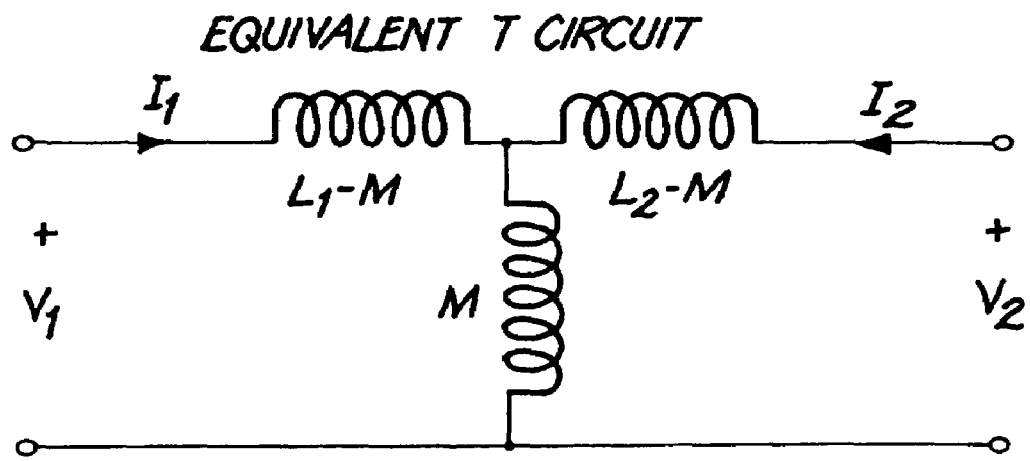
FIG. 8 is a circuit diagram of an equivalent T-circuit that illustrates another underlying relationship of factors involved in inductance.
Figure 9:
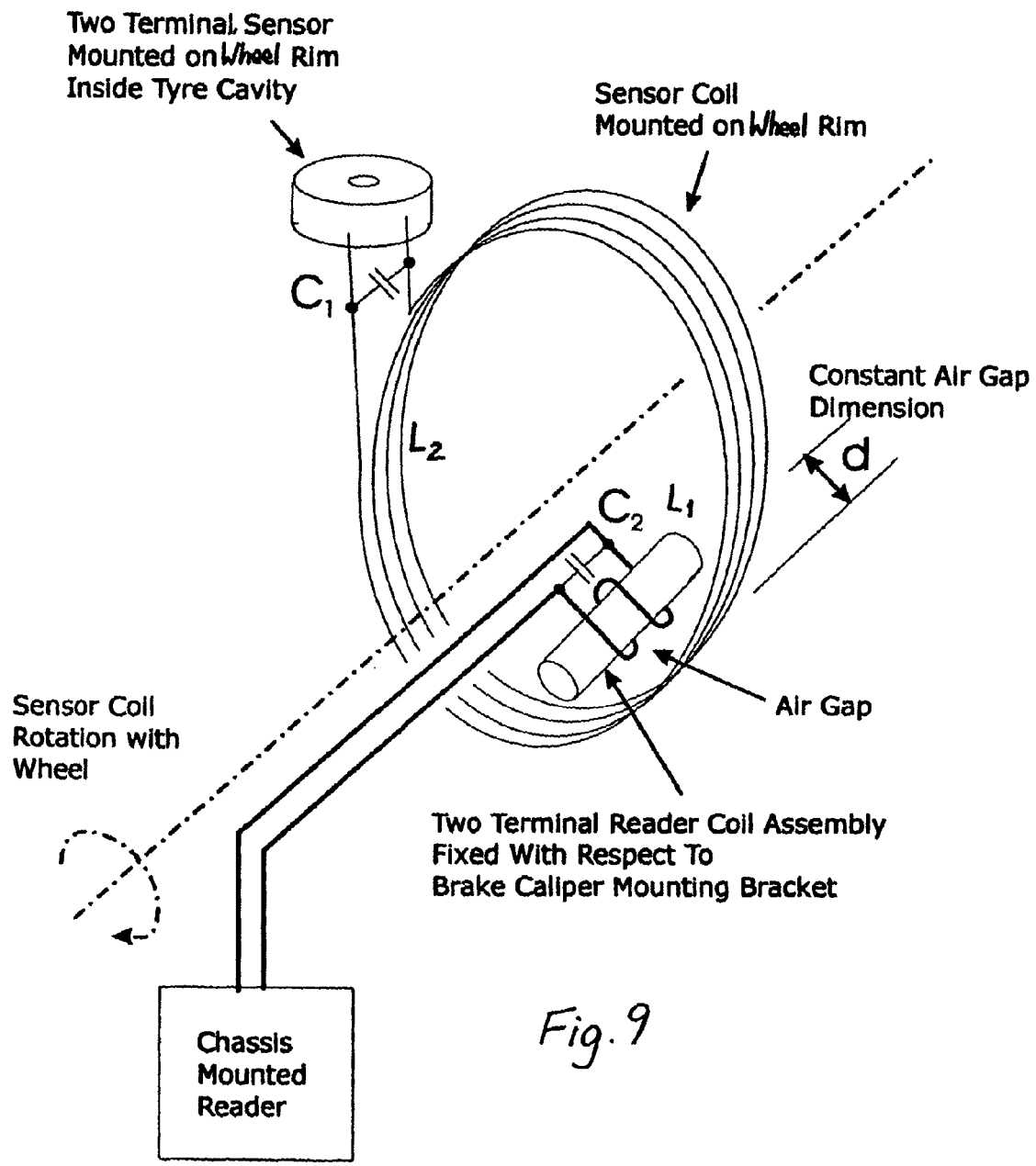
FIG. 9 is a diagram of a preferred two-wire communication channel for a vehicle tyre data monitoring system according to a second form of the invention, showing an arrangement of primary and secondary inductance coils.

A magnetic field is employed to couple energy from a reader coil to electrically isolated sensor elements located within each wheel. This form of magnetic or inductive coupling is technically referred to as "an inductively coupled two port circuit" or in practical terms and more simply as a transformer. The reader coil is the transformer's primary winding and the sensor coil is the secondary winding, both in close proximity and separated by an air gap. For purposes of analysis, all the conventional methods of transformer theory apply in terms of using mutual and self inductance to determine the various current and voltage relationships. Referring to FIG. 7 and FIG. 8 there are three significant relationships that apply and are exploited by this invention:

1) The "primary" voltage is the sum of the $I_1Z_1$ voltage drop and the voltage induced in the primary by the "secondary" current, $I_2$.

Figure 12:
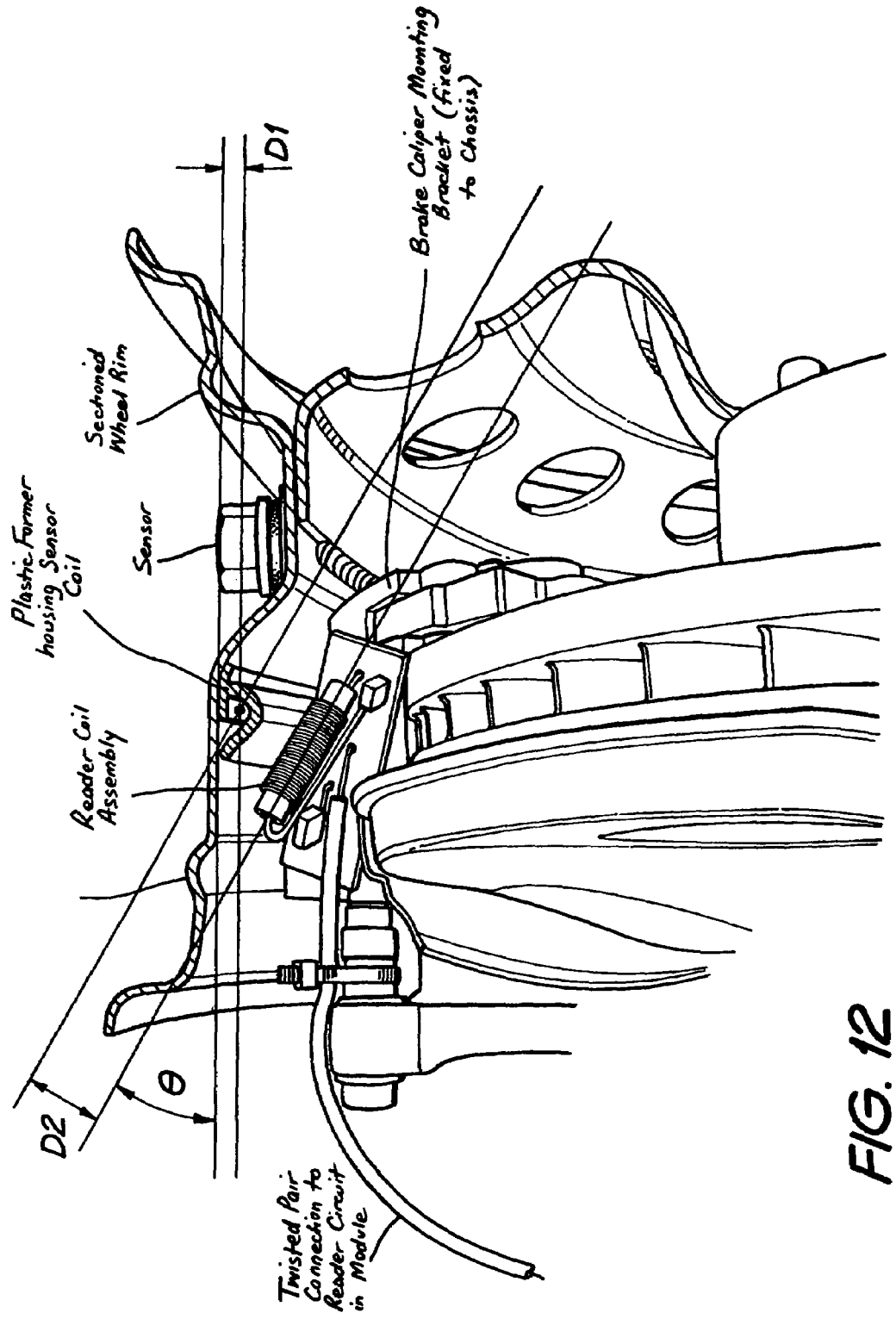
FIG. 12 is a diagram showing the preferred angular and distance relationships between various system components of the second form of the invention.

2) The magnitude and sign of mutual inductance M depend on the proximity and the orientation of the primary and secondary coils with respect to one another but remain constant with fixed positions (position parameters are indicated in FIG. 12).

3) At resonance the secondary impedance is a relatively low resistance but the impedance coupled into the primary as seen looking into the primary, is a relatively high resistance.

Figure 17:
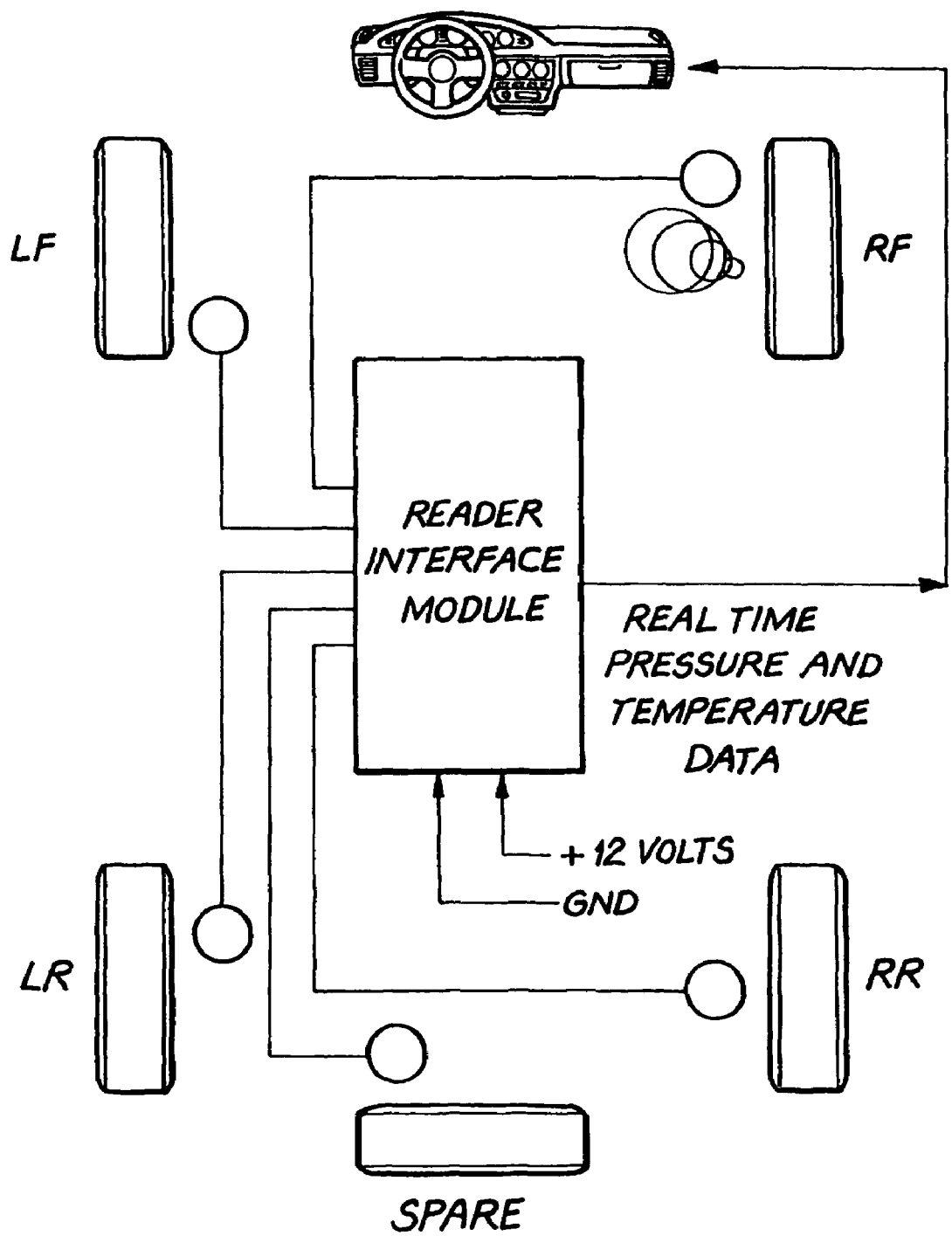
FIG. 17 is a diagram of a preferred electromagnetically coupled non-contact system according to a second form of the invention.
Figure 18:
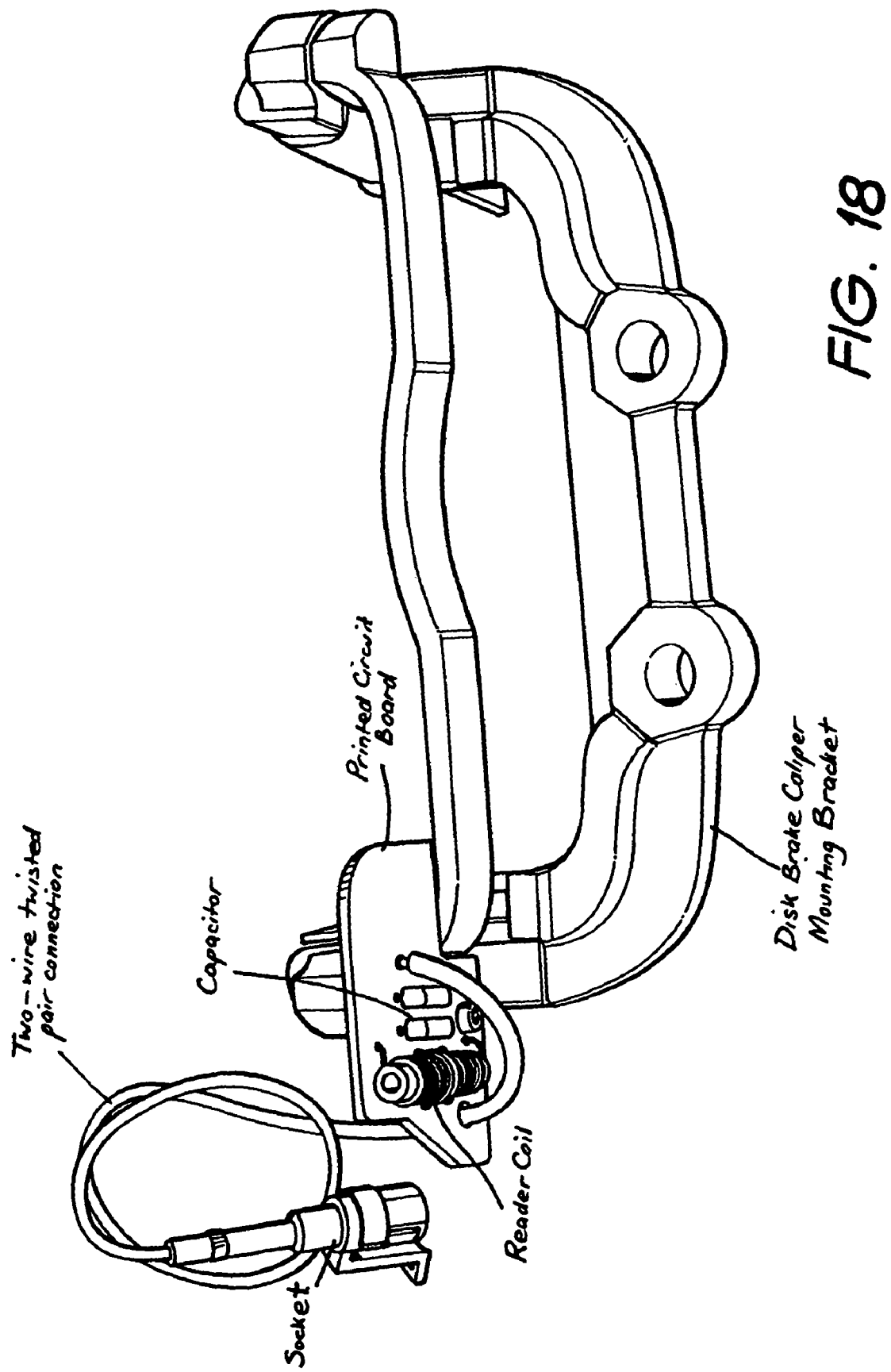
FIG. 18 is a diagram showing a preferred arrangement for mounting a reader coil assembly on a brake caliper mounting bracket.

Referring to FIG. 9, FIG. 10, FIG. 11 and FIG. 12, the physical arrangement of primary and secondary coils maintains a constant relative position between the two coils at all times whether the wheel is rotating or stationary. This results in the transformer's flux linkage being constant at all times due to a constant air gap dimension and thus a constant mutual inductance is maintained. FIG. 12 shows the system's wheel rims and brake caliper mounts. The rim is equipped with the passive sensor and coil elements. FIG. 18 shows how each brake caliper mounting bracket is equipped with a reader coil assembly (packaged capacitor and inductor), as is the spare tyre position securing clamp. Each reader coil assembly comprises a printed circuit board (PCB) on which is secured a reader coil, a capacitor (as a parallel resonant circuit), and other circuit components (not shown), the PCB being mounted to the brake caliper mounting bracket by a bolt assembly. The reader coil assembly is connected to the chassis mounted reader unit or module via a two wire twisted pair connection that terminates in a water proof socket adapted to mate with a plug from the reader module. The general arrangement is shown schematically in FIG. 17.

Figure 13:
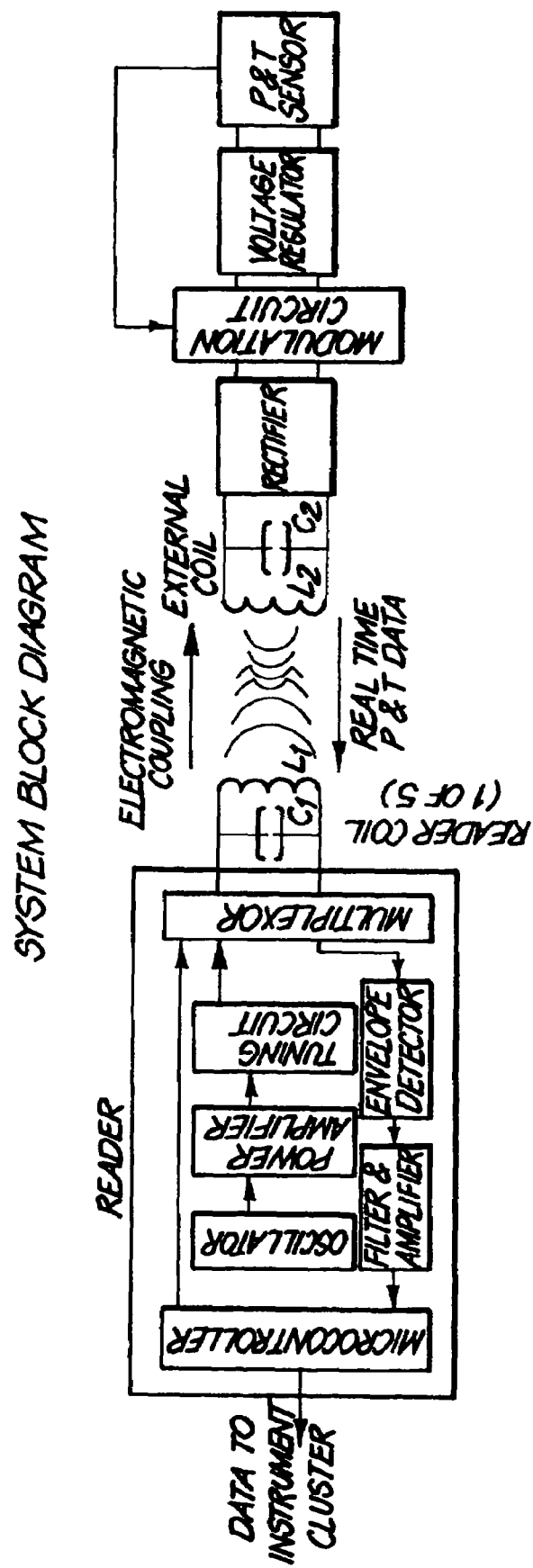
FIG. 13 is a summary block diagram of preferred circuit components of the second form of the invention.

Referring to the block diagram of FIG. 13, the reader consists of transmitter and receiver sections as well as a microprocessor for signal and data processing. The transmitter section has a Sinusoidal Oscillator signal (frequency of 572 KHz chosen to be approximately 60 times the sensor element's transmitted data bit frequency), power amplifier and tuned circuit with energizing coil. The receiver section has envelope detector, filter and amplifier circuits.

Figure 14:
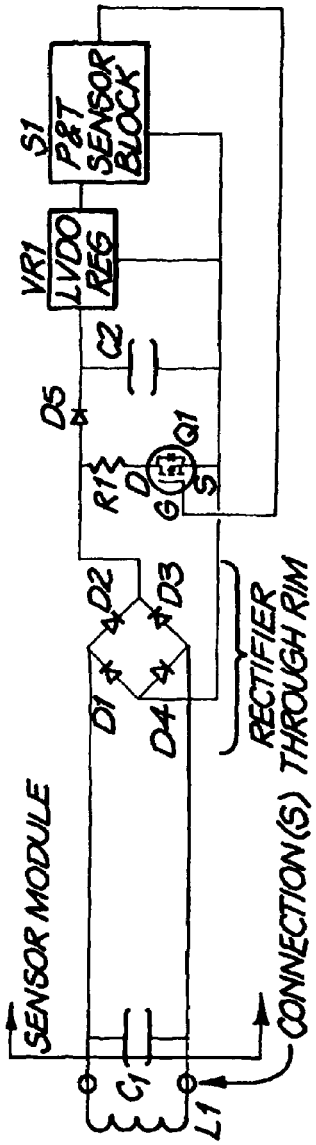
FIG. 14 is a diagram of a circuit for a first preferred sensor means used in the second form of the invention.
Figure 15:
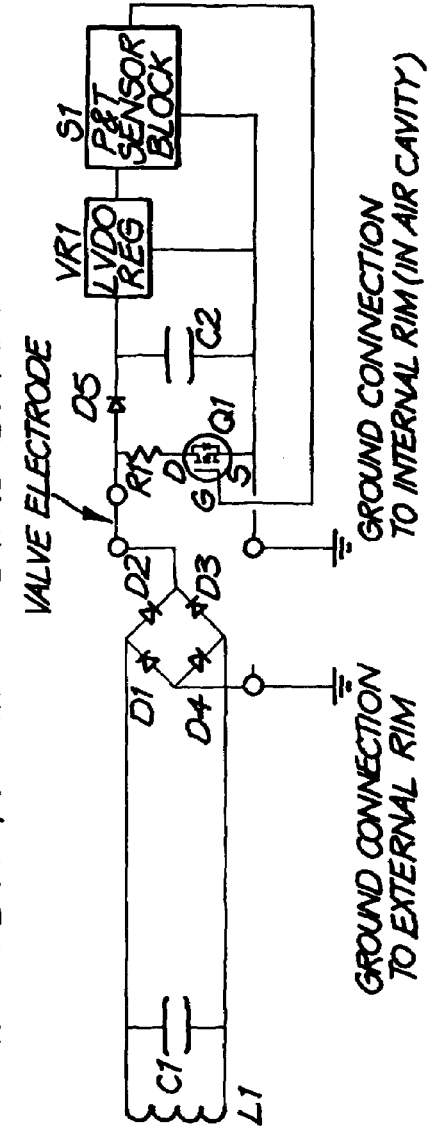
FIG. 15 is a diagram of a circuit for a second preferred sensor means used in the second form of the invention.
Figure 16:
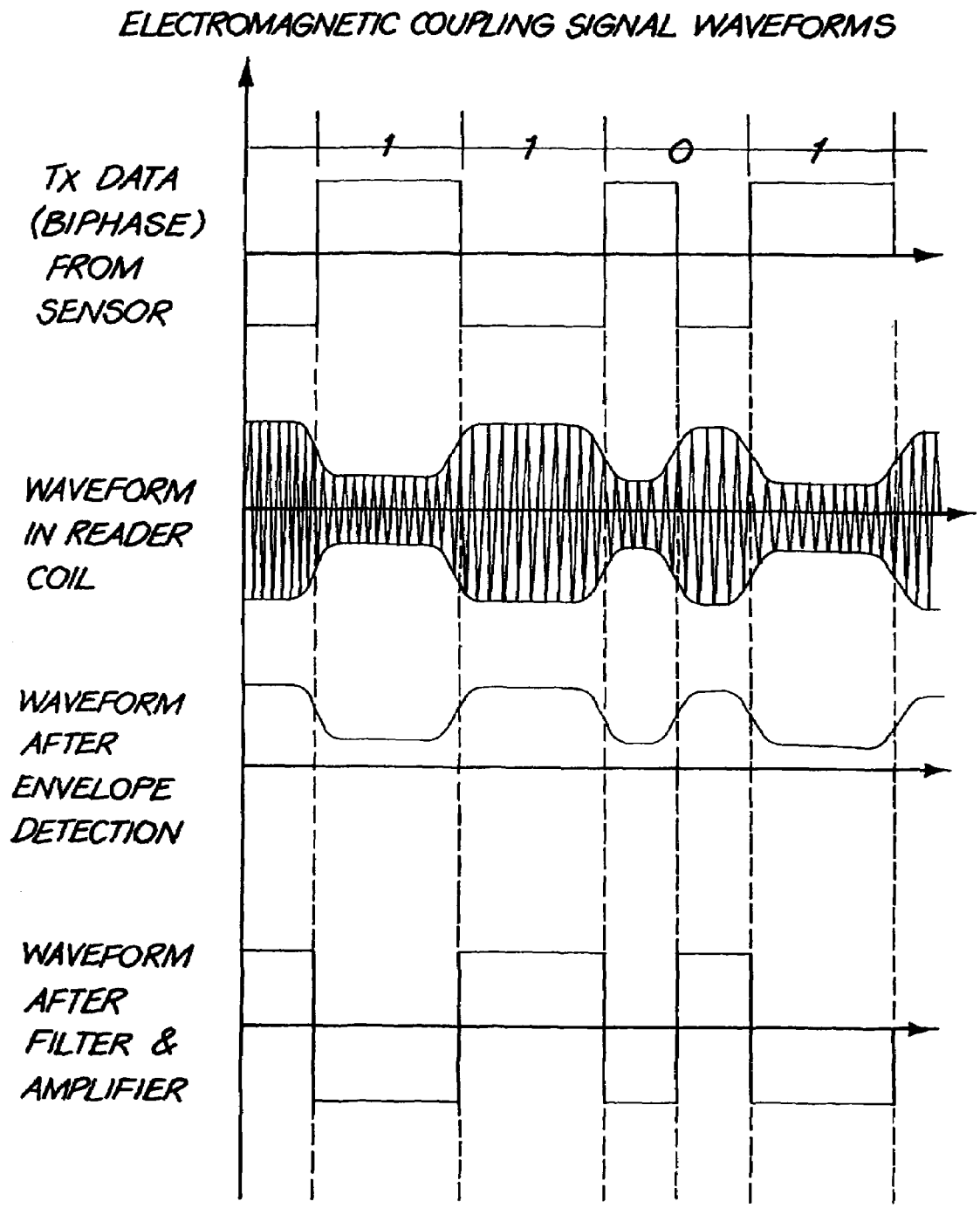
FIG. 16 is a diagram showing signal waveforms typical of an electromagnetically coupled arrangement of a second form of the invention.

The reader's microprocessor program sequentially selects a tyre position. The selected tyre position's energizing coil (one primary coil per tyre) is then driven by the power amplifier's sinusoidal output signal. The sensor element of the selected tyre derives its power from the energy field generated by the reader coil's (primary) changing (sinusoidal) magnetic flux in close proximity to the sensor coil (secondary). Referring to FIG. 14 and FIG. 15, this power is developed by rectifying the sensor coil's induced sinusoidal voltage. When the sensor's power supply circuit (rectifier, capacitor and voltage regulator) develops sufficient DC voltage, the sensor transmits a serial 10 Kbps bit rate biphase encoded datagram containing pressure, temperature, angular velocity and force vector information. This serial datagram is used to drive the gate of a Field Effect Transistor (FET) Q1, effectively shunting the rectifier with the resistor R1 in sympathy with the biphase encoded data. The shunt resistor R1 draws enough current to cause a damping of the oscillating field, also in sympathy with the biphase encoded data. This is seen as a change in amplitude of the field and the primary winding of the reader experiences a voltage drop in accordance with the transformer's mutual inductance behaviour. The reader's envelope detector diode peak-detects the amplitude modulated primary voltage at approximately 60 dB. This voltage, which represents the decoded tyre data information, is then filtered and amplified and is now available as a digital serial bit stream to the microprocessor for further analysis. The signal waveforms are shown in FIG. 16. The reader's microprocessor program sequentially selects the next tyre position and the cycle is repeated.

The primary and secondary coils are both configured with parallel capacitors having values to achieve parallel resonance at the oscillator's frequency of 572 KHz. At resonance, the input impedance is a pure resistance and the stored energy is transferred back and forth between the magnetic field of the inductance and the electric field of the capacitance. At the circuit's resonant frequency, the impedance is small and the forced response is large.

Figure 10:
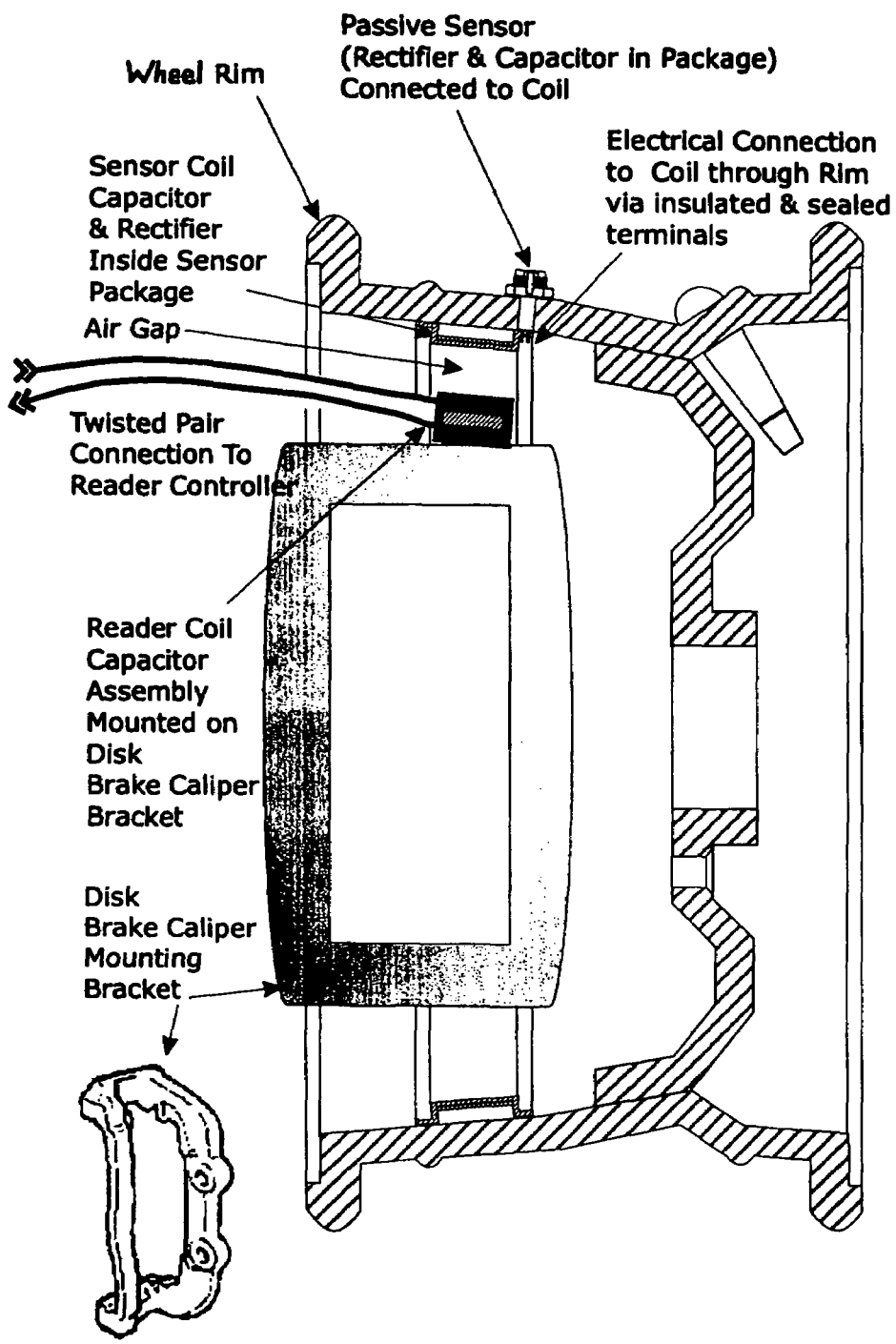
FIG. 10 is a diagram of a non-contact system according to a first preferred embodiment of the second form of the invention.
Figure 11:
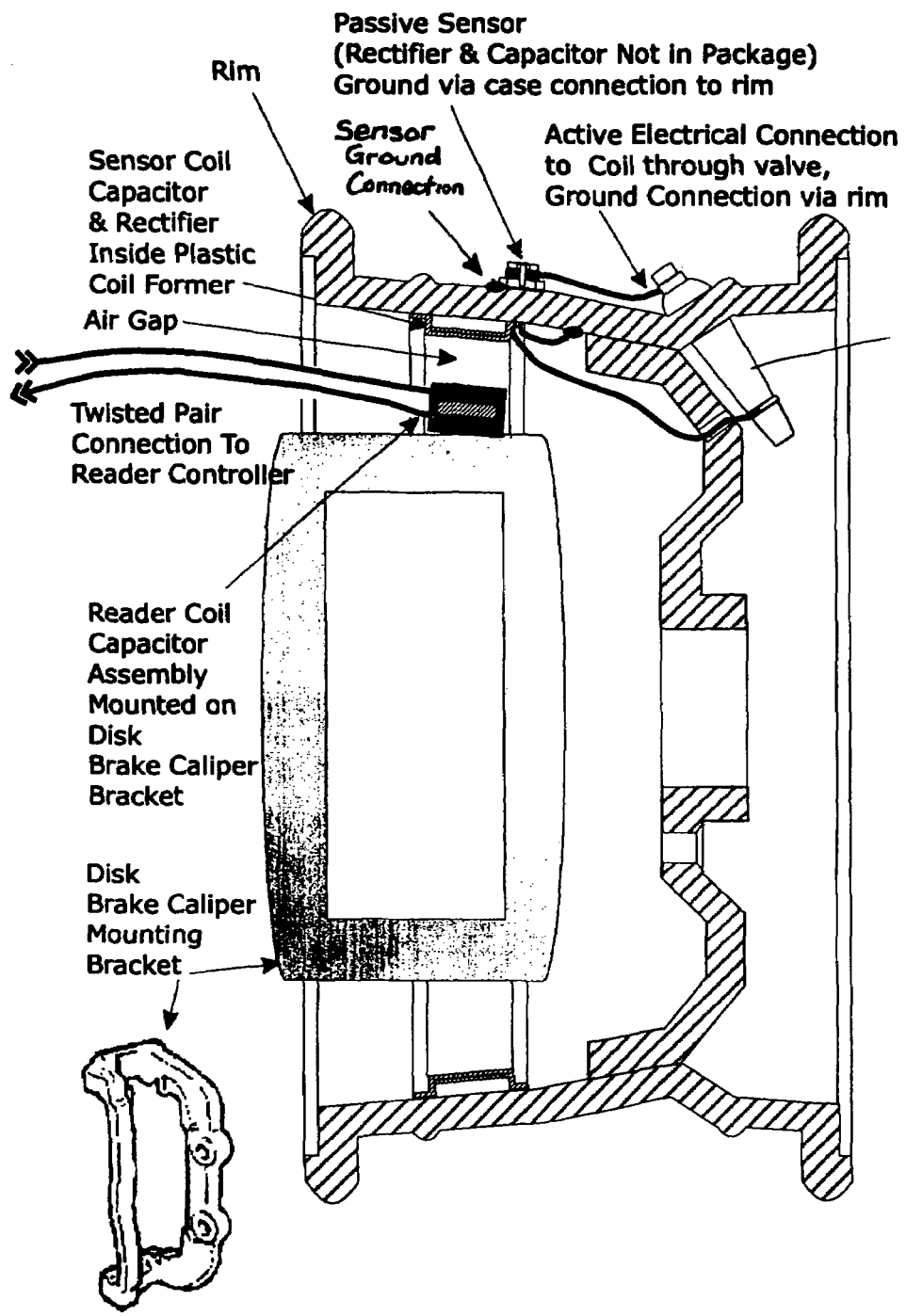
FIG. 11 is a diagram of a non-contact system according to a second preferred embodiment of the second form of the invention.

Two methods of connecting the sensor coil to the sensor package are shown in FIGS. 10 and 11. FIG. 10 shows connections via two insulated and sealed electrodes through the wheel rim (see also FIG. 19). In this case, the rectifier and tuning capacitor are encapsulated within the sensor package and both Ground and Data/Power connections are electrically insulated (by epoxy resin and rubber seals) from the wheel rim. In an alternative form, FIG. 11 shows the sensor package Ground connection via the internal wheel rim and the active Data/Power connection to the coil made via the valve stem acting as an insulated electrode. This method obviates the need for any additional penetrations through the wheel rim air cavity, however, the rectifier and tuning capacitor are housed in the plastic coil former along with the sensor coil. Importantly, both methods achieve two terminal sensor and coil assembly connections.

It will be appreciated by persons skilled in the art that numerous variations and/or modifications may be made to the invention as represented in the specific embodiments described and depicted herein, without departing from the spirit or scope of the invention as broadly described. The present embodiments are, therefore, to be considered in all respects as illustrative and not restrictive.

The invention claimed is:

1. A vehicle tyre data monitoring system comprising a wheel mounted sensor means adapted to transmit one or more of pressure, temperature, angular velocity, and force vector data for a tyre as a digital serial datagram through a two-wire, electromagnetically coupled, communication channel to a chassis mounted reader means, the communication channel comprising an electromagnetic coupling means adapted to have constant mutual inductance for all stationary or rotating positions of the tyre and to simultaneously supply power to the sensor means and receive the data for processing and subsequent display to a user of the system, wherein the sensor means includes a sensor coil that is mounted annularly on a rim of the wheel and is coiled around a first axis, and wherein the reader means includes a receiver coil that is coiled around a second axis that is noncoincident with the first axis.

2. The vehicle tyre data monitoring system of claim 1 wherein the sensor means comprises a three or more terminal sensor subsystem having at least separate ground, power and data connections which is converted to a two terminal sensor subsystem for transmitting the data across the communication channel to the reader means, with a first terminal being for a ground connection and a second terminal being for a combined power and data connection.

3. The vehicle tyre data monitoring system of claim 2 wherein the two-wire communication channel superimposes the transmission of the data on the power connection as a serial datagram that is received by the receiving means.

4. The vehicle tyre data monitoring system of claim 3 wherein the datagram is decoded by the reader means to provide decoded information that is made available to a microprocessor system for analysis and display of the tyre data to a user of the system.

5. A two-wire communication channel for a vehicle tyre data monitoring system, the channel including electromagnetic coupling means for communicating between a sensor means mounted on a wheel of the vehicle and a reader means mounted on a chassis of the vehicle, and being adapted to transmit one or more of pressure, temperature, angular velocity and force vector data for a tyre as a digital serial datagram from the sensor means to the reader means and to supply power from the reader means to the sensor means, the supply of power being simultaneous with the transmission and reception of the data, wherein the electromagnetic coupling means includes a sensor coil mounted annularly on a rotatable rim for the wheel and a receiver coil mounted on a non-rotating component of a hub for the wheel, the sensor coil and the receiver coil being adapted to maintain a constant mutual inductance therebetween during a complete rotation of the wheel, the sensor and receiver coils providing a non-contacting, two wire communication channel for the data monitoring system,
wherein the sensor coil is coiled around a first axis and the receiver coil is coiled around a second axis that is non-coincident with the first axis.

6. A vehicle wheel to hub electromagnetic coupling interconnection in a tyre data monitoring system for the transmission thereacross of one or more of pressure, temperature, angular velocity and force vector data for a tyre mounted on the wheel, the electromagnetic coupling interconnection comprising a first part mounted on a rotatable rim of the wheel and adapted to receive the data from a sensor means, and a second part mounted on a non-rotating component of a hub for the wheel, the second part being adapted to maintain a constant air gap distance with the first part when the wheel is mounted on the hub so as to maintain constant mutual inductance between the first part and the second part for allowing the data to be transmitted from the first part to the second part, the second part being further adapted to transmit the data to a reader means mounted on a chassis of the vehicle for processing and subsequent display to a user of the system,
wherein the first part includes a sensor coil that is mounted annularly on the rim and that is coiled around a first axis, and
wherein the second part includes a receiver coil that is coiled around a second axis that is noncoincident with the first axis.

7. The vehicle wheel to hub electromagnetic coupling interconnection of claim 6 wherein the constant air gap distance between the first part and the second part is maintained after each mounting of the wheel on the hub.

8. A two-wire communication channel for a vehicle tyre data monitoring system, the channel including electromagnetic transforming means for communicating between a sensor means mounted on a wheel of the vehicle and a reader means mounted on a chassis of the vehicle, and being adapted to transmit one or more of pressure, temperature, angular velocity and force vector data for a tyre as a digital serial datagram from the sensor means to the reader means and to supply power from the reader means to the sensor means, the supply of power being simultaneous with the transmission and reception of the data, wherein a first part of the electromagnetic transforming means is mounted annularly on a rim of the wheel and a second part of the electromagnetic transforming means is mounted on a non-rotating component of a hub for the wheel, the first and second parts being divided by an air gap and providing a non-contacting, two wire communication channel for the data monitoring system,
wherein the second part comprises a receiver coil mounted on the non-rotating component of the hub for the wheel, and the first part comprises a sensor coil so mounted annularly on the rim of the wheel as to maintain a constant and sufficiently proximate distance to the receiver coil during rotation of the wheel for electromagnetic induction to occur, and
wherein the sensor coil is coiled around a first axis and the receiver coil is coiled around a second axis that is non-coincident with the first axis.

9. An electromagnetic coupling in a two-wire communication channel for a vehicle tyre data monitoring system, the electromagnetic coupling comprising a first part mounted annularly on a rim of a wheel of the vehicle, and a second part mounted on a non-rotating component of a hub for the wheel, the first part and the second part being adapted to maintain electromagnetic induction therebetween during rotation of the wheel for the transmission of decodable data for the tyre from a sensor means mounted on the wheel to a reader means mounted on the chassis,
wherein the second part comprises a receiver coil mounted on the non-rotating component of the hub for the wheel, and the first part comprises a sensor coil so mounted annularly on the rim of the wheel as to maintain a constant and sufficiently proximate distance to the receiver coil during rotation of the wheel for electromagnetic induction to occur, and
wherein the sensor coil is coiled around a first axis and the receiver coil is coiled around a second axis that is non-coincident with the first axis.

10. The two-wire communication channel of claim 8 wherein the sensor coil includes a power supply circuit and derives power to operate the sensing and transmission of the data from an electromagnetic flux generated by the receiver coil serving as a power connection, the electromagnetic flux causing the power supply circuit of the sensor coil to develop sufficient DC voltage to enable the sensor means to be energised and to transmit the data to the reader means, the data being adapted to modulate the electromagnetic flux so as to superimpose the transmission of the data on the power connection as a serial datagram, the so modulated signal being detected and decoded by the reader means to enable the data to be processed and displayed to a user of the system.

11. The electromagnetic coupling of claim 9 wherein the sensor coil includes a power supply circuit and derives power to operate the sensing and transmission of the data from an electromagnetic flux generated by the receiver coil serving as a power connection, the electromagnetic flux causing the power supply circuit of the sensor coil to develop sufficient DC voltage to enable the sensor means to be energised and to transmit the data to the reader means, the data being adapted to modulate the electromagnetic flux so as to superimpose the transmission of the data on the power connection as a serial datagram, the so modulated signal being detected and decoded by the reader means to enable the data to be processed and displayed to a user of the system.

* * * * *